United States Patent
Geissenhöner

(10) Patent No.: US 9,744,941 B2
(45) Date of Patent: Aug. 29, 2017

(54) MOTOR VEHICLE WITH REMOTE START AND SUBSEQUENT AUTOMATIC SHUTDOWN

(71) Applicant: AUDI AG, Ingolstadt (DE)

(72) Inventor: Martin Geissenhöner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/036,648

(22) PCT Filed: Sep. 13, 2014

(86) PCT No.: PCT/EP2014/002481
§ 371 (c)(1),
(2) Date: May 13, 2016

(87) PCT Pub. No.: WO2015/070938
PCT Pub. Date: May 21, 2015

(65) Prior Publication Data
US 2016/0280182 A1    Sep. 29, 2016

(30) Foreign Application Priority Data

Nov. 15, 2013    (DE) .......................... 10 2013 019 140

(51) Int. Cl.
*G05D 1/00*    (2006.01)
*G05D 3/00*    (2006.01)
(Continued)

(52) U.S. Cl.
CPC ............ *B60R 25/04* (2013.01); *B60R 25/209* (2013.01); *F02N 11/0807* (2013.01);
(Continued)

(58) Field of Classification Search
CPC .............................. B60R 25/209; B60R 25/04
See application file for complete search history.

(56) References Cited

U.S. PATENT DOCUMENTS

| 5,736,935 A | 4/1998 | Lambropoulos |
| 5,757,086 A | 5/1998 | Nagashima |

(Continued)

FOREIGN PATENT DOCUMENTS

| CN | 2144078 | 10/1993 |
| CN | 102602363 | 7/2012 |

(Continued)

OTHER PUBLICATIONS

Examination Report for German Application No. 10 2013 019 140.8 dated Jul. 21, 2014.
(Continued)

*Primary Examiner* — Imran Mustafa
(74) *Attorney, Agent, or Firm* — Alston & Bird LLP

(57) ABSTRACT

The invention relates to a method for operating an internal combustion engine (14) of a motor vehicle (10), in that the internal combustion engine (14) is started using a remote start unit (18) for wireless reception of a remote start signal (R) and afterwards is monitored by a shutdown unit (36) to determine whether a shutdown condition is fulfilled. When appropriate, the internal combustion engine (14) is shutdown again. A radio key device (26) of the motor vehicle (10) is designed to detect a radio key presence in a passenger compartment (28) of the motor vehicle (10) using a key scan and to signal a radio key presence by means of a key presence signal (A). The problem addressed by the invention is to adapt the subsequent shutdown of the internal combustion engine (14) more flexibly to the position of the driver following a remote start. The shutdown condition comprises for this purpose that the key presence signal (A) must have been inactive for a predefined minimum time period. A presence of a person in the passenger compartment (28) is detected by a monitoring device (32) by means of a sensor unit (24, 38, 40 42) and, upon detecting the presence (Continued)

of a person, at least one key scan is triggered at at least one predefined time by means of a control signal (P).

8 Claims, 1 Drawing Sheet

(51) Int. Cl.
    *G06F 7/00*         (2006.01)
    *G06F 17/00*       (2006.01)
    *B60R 25/04*       (2013.01)
    *F02N 11/08*       (2006.01)
    *B60R 25/20*       (2013.01)
    *F02N 11/00*       (2006.01)

(52) U.S. Cl.
    CPC ....... *B60R 2025/0405* (2013.01); *F02N 11/00* (2013.01); *F02N 2200/106* (2013.01)

(56) References Cited

U.S. PATENT DOCUMENTS

| | | |
|---|---|---|
| 6,091,330 A | 7/2000 | Swan et al. |
| 7,859,129 B2 | 12/2010 | Ozawa et al. |
| 2003/0080565 A1 | 5/2003 | McCullough |
| 2008/0203815 A1 | 8/2008 | Ozawa et al. |
| 2009/0265048 A1* | 10/2009 | Ono ..................... B60R 25/209 701/2 |
| 2011/0148566 A1 | 6/2011 | Ledendecker |
| 2011/0202201 A1 | 8/2011 | Matsubara |

FOREIGN PATENT DOCUMENTS

| | | |
|---|---|---|
| DE | 19811786 A1 | 9/1999 |
| DE | 19860350 B4 | 6/2000 |
| DE | 10250598 B4 | 5/2003 |
| DE | 10 2007 057 216 A1 | 6/2009 |
| DE | 10 2008 039 303 A1 | 3/2010 |
| DE | 10 2009 022 638 A1 | 12/2010 |
| EP | 2 313 642 B1 | 4/2011 |
| JP | 2006153006 | 6/2006 |
| WO | WO 2010/020330 A1 | 2/2010 |

OTHER PUBLICATIONS

International Search Report and Written Opinion for Application No. PCT/EP2014/002481 dated Dec. 12, 2014.

Office Action for corresponding Chinese Application No. 201480012293.3 dated Jul. 4, 2016.

International Preliminary Report on Patentability for corresponding International Application No. PCT/EP2014/002481, dated Sep. 13, 2014.

* cited by examiner

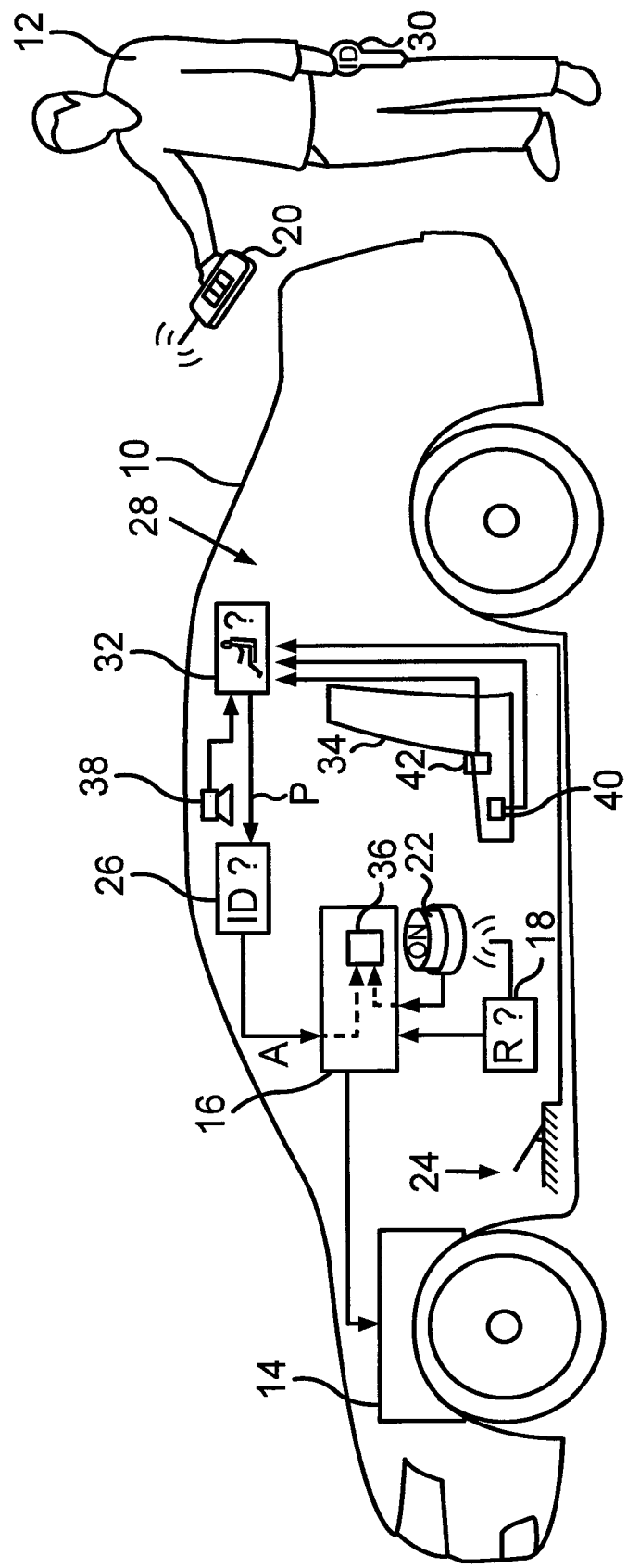

MOTOR VEHICLE WITH REMOTE START AND SUBSEQUENT AUTOMATIC SHUTDOWN

CROSS REFERENCE TO RELATED APPLICATIONS

This application is a national stage 371 application of International Application No. PCT/EP2014/002481 filed Sep. 13, 2014, which claims priority to and the benefit of German Application No. 102013019140.8, filed Nov. 15, 2013, the entire contents of which are hereby incorporated by reference.

The invention concerns a motor vehicle with a remote start unit, a shutdown device and a radio key device. The remote start unit is designed to start an internal combustion engine of the motor vehicle upon wireless reception of a remote start signal, for example, in order to warm up the motor vehicle in the winter before the driver gets into it. The remote starting of a motor vehicle is also known as a remote start function. The shutdown device is designed to shut down the internal combustion engine after a start by the remote start unit depending on a shutdown condition, for example, in order to prevent unauthorized use of the motor vehicle.

Thus, in US 2009/0265048 A1 a motor vehicle with a remote start unit and an authorization device is described, which prevents an unauthorized person from jumping into the motor vehicle and driving away when the motor vehicle is in the "remote started" state with internal combustion engine running. For this, the authorization device checks to see whether an authorized radio key is present inside the motor vehicle while a person is trying to drive away with the remote-started motor vehicle.

Other motor vehicles with remote start device are known from US 2011/0202201 A1, US 2008/0203815 A1, U.S. Pat. No. 5,757,086 A, DE 10 2009/022 638 A1 and DE 10 2008 039 303 A1.

In order to drive away at once in a remote-started motor vehicle, it is known from the prior art how to take over the engine operation by pressing a start/stop button replacing the ignition lock, i.e., to deactivate the shutdown device, so that the remote-started and still running internal combustion engine is not automatically shut down once more. However, the takeover must occur generally within 30 seconds of the closing of the driver's door. Otherwise, the shutdown device will become active, that is, it will shut down the internal combustion engine. Namely, the shutdown condition checks the shutdown condition that the After this time runs out, the engine is then halted by the shutdown device. The reason for the shutdown of the internal combustion engine after this time may be a theft protection, for example. One can ensure a user safety in this way, so that children who have gotten into the remote-started motor vehicle cannot set the motor vehicle in motion in unauthorized fashion.

The drawback to the automatic shutdown of the internal combustion engine after a remote start is that the driver is forced, within a time of 30 seconds for example, to press the start/stop button and take over the remote start engine operation. On the other hand, if he is distracted or delayed in doing this, the internal combustion engine shuts down and a restarting is required.

The invention proposes to solve the problem of adapting the shutdown of an internal combustion engine in more flexible manner to the situation of the driver after a remote start.

The problem is solved by the subject matter of the independent patent claims. Advantageous modifications of the invention are given by the features of the dependent patent claims.

The invention provides a method by which an internal combustion engine of the motor vehicle is operated at first in familiar manner, such that the internal combustion engine is started by a remote start unit upon wireless reception of a remote start signal. The remote start signal for this can be generated in familiar manner by a specially provided remote control used by the operator of the motor vehicle. After the internal combustion engine has been remote-started, i.e., no driver is yet inside the motor vehicle, a shutdown device monitors to see whether a shutdown condition is fulfilled. If so, i.e., if the shutdown condition is fulfilled, the internal combustion engine is again shut down. In the prior art, it is generally provided that the shutdown condition is that the start/stop button for the internal combustion engine must be pressed within 30 seconds of a closing of the driver's door. Otherwise, the internal combustion engine is shut down.

Now, in the method according to the invention, a different shutdown condition is provided. This is based on a radio key device of the motor vehicle. The radio key device can be designed in familiar fashion according to the prior art, that is, it is designed to carry out a so-called key scan in the passenger compartment of the motor vehicle, by which a radio key presence is detected. The key scan can involve, e.g., the sending out of a polling signal by the radio key device and (if the radio key is present) the receiving of a response signal sent back by the radio key. If the driver is sitting in the motor vehicle and he has his radio key on him, this radio key will be in the passenger compartment and thus be detected wirelessly by means of the response signal. The radio key device then signals the radio key presence by means of a radio key presence signal.

Now, in the method according to the invention, the shutdown condition for the shutdown of the internal combustion engine after a remote start is that the key presence signal must be inactive for a predetermined minimum time. In other words, the minimum time must have elapsed since the last recognition of the radio key presence. Only then does the shutdown device turn off the internal combustion engine once again. The minimum time can lie for example in a range of 20 seconds to 2 minutes. A radio key device generally carries out the key scan only after the pressing of the start/stop button. But in the method according to the invention, it is provided additionally or alternatively to this that a person's presence in the passenger compartment is detected. If the person's presence is detected, a control signal is generated at least once at a predetermined time, by which the key scan is triggered for the radio key device.

For example, it can be detected whether the driver operates a seatbelt buckle, i.e., buckles up. This is then evaluated as a person's presence and the control signal is generated. Thus, the driver has time once again after the locking of the seatbelt for the predetermined minimum time, i.e., 30 seconds for example, to press the start/stop button. Thus, if the driver gets in, closes the driver's door and spends 20 seconds in buckling up, in the prior art there would remain only 10 seconds to press the start/stop button in the event that the shutdown device waits for only 30 seconds. In the method according to the invention, the control signal is generated after the buckling up, so that the time countdown starts anew in the shutdown device and the driver again has 30 seconds time, for example, to press the start/stop button. The person detection in the motor vehicle according to the invention is carried out by a monitoring device, which can be for example a program module for a control device or a central computing device. The monitoring device detects the person by means of a sensor device of the motor vehicle.

The method according to the invention provides the benefit that no more additional restriction exists for the takeover of the engine operation, as long as the driver performs other operations in the motor vehicle which are recognizable by the monitoring device through the sensor device. This also produces an enhanced user comfort.

The invention also provides a motor vehicle for carrying out the method according to the invention, having the described devices, namely, the remote start unit, the shutdown device and the radio key device. The remote start unit is designed to start an internal combustion engine of the motor vehicle upon wireless reception of a remote start signal. The shutdown device is designed to shut down the internal combustion engine once more after a start by the remote start unit in dependence on a shutdown condition. The radio key device is designed to detect a radio key presence in a passenger compartment of the motor vehicle by a key scan and to signal it by means of a key presence signal. In the motor vehicle according to the invention, the shutdown condition is that the key presence signal must have been inactive for a predetermined minimum time, that is, for the predetermined minimum time of 30 seconds, for example, no successful key scan could be performed by which the key presence signal is generated to indicate a radio key presence. The motor vehicle according to the invention furthermore has the described monitoring device, which is designed to detect by means of a sensor device of the motor vehicle, i.e., one or more sensors, a person's presence in the passenger compartment and upon detecting a person's presence to trigger the key scan by means of control signal at least at a predetermined time.

According to one modification of the motor vehicle according to the invention, the monitoring device detects by means of the sensor device the following events or at least one (non-empty) subset of the events: the closing of an outer door of the motor vehicle, the locking of a seatbelt buckle, the activating of one of the pedals of the motor vehicle, a first-time activity of the key presence signal after the start by the remote start unit, a motion recognition by a motion sensor, a seat occupancy detection. The sensors required for the recognizing of these events can be taken from the prior art. For the motion recognition, however, one can also use a camera in particular, such as can be arranged in the roof of the motor vehicle or in a mirror of the motor vehicle. One can also use a camera of an eye-tracker for identification of a viewing direction. The camera can also be an infrared camera, which has the special benefit that it can also recognize in the dark whether a person is moving inside the motor vehicle. Preferably, it will check whether a movement has occurred in the area of the driver's seat and not a passenger's seat or the rear seat bank. This will avoid children at play from preventing the automatic shutdown of the internal combustion engine by their movement.

One modification of the motor vehicle according to the invention calls for the monitoring device to generate the control signal after recognizing the person's presence not only once, but also several times and/or cyclically. In this way, a key scan is performed repeatedly after a onetime detecting of a person's presence. This produces the benefit that the driver does not need to keep performing new actions to prevent the automatic shutdown of the internal combustion engine by the shutdown device. The repeated key scan can then be ended after a predetermined maximum time if no remote start takeover by the driver has occurred by that time. For example, the repeated key scan can be ended at a maximum time which can be in the range of 1 minute to 5 minutes or up to 10 minutes.

The cycle duration for a cyclical key scan is preferably less than the minimum time or the cycle duration is at least equal to the minimum time. This will prevent the key presence signal from being generated too late and the shutdown device from turning off the internal combustion engine even though there is a driver in the motor vehicle.

Instead of an automatically repeated key scan it can also be provided that the monitoring device checks for the person's presence after the remote start several times and after each detected person's presence generates the control signal one time. This will ensure that the internal combustion engine is shut down again as soon as possible after the shutdown condition. This prevents needless consumption of energy of the internal combustion engine.

In order to coordinate the monitoring device and the shutdown device with each other, one modification of the motor vehicle according to the invention calls for the monitoring device upon detected person's presence to generate the control signal for the first time within the minimum time. Thus, the control signal for triggering the key scan reaches the radio key device in good time, so that when a driver is present the key presence signal is generated early enough to prevent the shutdown by the shutdown device.

In order to also make possible a remote start takeover in the motor vehicle according to the invention, one modification calls for providing a takeover device, which is designed to generate an activation-dependent takeover signal for deactivating the shutdown device. In other words, the takeover device must be activated by the driver in order for it to generate the takeover signal. The takeover device can be, for example, the described start/stop button for the internal combustion engine. In addition or alternatively to this, a different control element can also be provided, which is operated by a driver seated in the motor vehicle by a deliberate action in order to deactivate the shutdown device.

The motor vehicle according to the invention is preferably configured as an automobile, especially a passenger car.

The invention also includes modifications of the method according to the invention, which contain features that have already been described here in connection with the modifications of the motor vehicle according to the invention. For this reason, the corresponding modifications of the method according to the invention will not be further described here.

In what follows, a sample embodiment of the invention is described. For this, the single FIGURE (FIGURE) shows one embodiment of the motor vehicle according to the invention.

The sample embodiment explained hereafter is a preferred embodiment of the invention. Yet the components of the embodiment described in the sample embodiment each time constitute individual features of the invention to be viewed independently of each other, which also modify the invention independently of each other and thus also are to be regarded as part of the invention, individually or in a combination other than the one shown. Furthermore, the described embodiment can also be amplified by other of the already described features of the invention.

The FIGURE shows a motor vehicle 10, which can be for example an automobile, especially a passenger car. Outside the motor vehicle 10 there is a person 12 who would like to drive the motor vehicle 10.

The motor vehicle 10 can have, as its propulsion engine, an internal combustion engine 14, i.e., for example, an Otto engine or a Diesel motor. The internal combustion engine 14 can be started and turned off by a control system 16. The control system 16 can comprise, for example, one or more control devices and/or one or more program modules.

The motor vehicle 10 can furthermore have a remote start unit 18. The remote start unit 18 can be coupled with the internal combustion engine 14 and/or the control system 16. The remote start unit 18 can be designed in familiar fashion to receive a remote start signal R from a remote control 20, which can be operated by the person 12. The remote control 20 can be, for example, a device provided solely to generate the remote start signal R or it can also be a smartphone, for example, which has corresponding control software (APP-application) by means of which the smartphone generates the remote start signal R upon an operator command from the person.

The motor vehicle 10 can furthermore have a start control element 22 and a brake pedal 24. The start control element 22 can be, for example, a start button, which is provided to make possible a keyless start of the internal combustion engine 14, as is known in itself from the prior art.

The motor vehicle 10 can also have a radio key device 26, which determines, for example when the start control element 22 is activated, whether a radio key 30 is present in a passenger compartment 28, in which identification data ID can be stored, by which the person 12 is authorized to operate the motor vehicle 10. For this, the radio key device 26 can perform a key scan. The radio key device 26 can be configured in familiar fashion for this. The radio key device 26 optionally signals by a key presence signal A for example to the control system 16 that the radio key 30 is in fact present in the passenger compartment 28.

The motor vehicle 10 can furthermore have a monitoring device 32, by which the presence of a person in the passenger compartment 28 is reported by a person's presence signal P to the control system 16 for example. The monitoring device 32 can likewise be based on familiar technology.

With the motor vehicle 10 it is possible for the person 12 to first trigger a remote start from outside the motor vehicle, i.e., to generate with the remote control 20 the remote start signal R, so that the remote start unit 18 starts the internal combustion engine 14 and supplies power, e.g., to an air conditioning system (not shown). After this, the person 12 can take a seat in the motor vehicle 10, i.e., open a driver's door of the motor vehicle 10 (not shown) and sit down on a driver's seat 34. The person 12, for example by activating the start control element 22, can take over the remote start, that is, after an activation of the start control element 22 the internal combustion engine 14 will remain running until the person 12 himself shuts down the internal combustion engine 14, for example, by again pressing the start control element 22.

But there can also be provided in the motor vehicle 10 a shutdown device 36, which shuts down the internal combustion engine after a remote start by the remote start unit 18 without any involvement of the driver if it is detected that the person 12 evidently does not wish to drive off with the motor vehicle 10 at once, after the driver's door of the motor vehicle 10 has been opened once and again closed. For this, the monitoring device 36 checks a shutdown condition. The checking can begin, for example, after a onetime opening and closing again of the driver's door or another outer door of the motor vehicle 10 has been detected.

Such a monitoring device is known in the prior art, wherein after the closing of the driver's door a person in the passenger compartment 28 has a predetermined time, such as 30 seconds, to activate the start control element 22. If the start control element 22 is not activated after the time, the shutdown device 36 shuts down the internal combustion engine 14.

With the motor vehicle 10, on the other hand, the person 12 is provided more time, depending on the situation. The internal combustion engine 14 is only shut off when it is clear that the person 12 is busy for a lengthy time with something other than preparing to drive away. For this, the shutdown of the internal combustion engine 14 by the shutdown device 36 depends on whether the radio key 30 is present in the passenger compartment 28. For this, the shutdown device 36 monitors whether the authorization signal is generated by the radio key device 26. If the authorization signal A has not been generated for a predetermined minimum time, it is assumed that the person 12 is not even in the motor vehicle 10 and therefore the internal combustion engine 14 can be shut down after an activation of the driver's door. Accordingly, if the shutdown condition is fulfilled the shutdown device 36 generates a shutdown signal, by which the internal combustion engine 14 is shut down.

In order for the radio key device 26 to generate the authorization signal A, a key scan must be performed during which the radio key 30 is detected inside the motor vehicle 10, i.e., in the passenger compartment 28. In order to perform a key scan repeatedly by the radio key device 26, the monitoring device 32 watches to see whether there is an indication that the person 12 after closing the driver's door or another outer door is even inside the passenger compartment 28. For this, the monitoring device 32 can evaluate signals from one or more sensors of the motor vehicle 10. For example, a respective sensor signal of a camera 38, a seat occupancy sensor 40 of the driver's seat 34, a seatbelt buckle 42 with a sensor for detecting an inserted seatbelt and/or an activation sensor for the pedal 24 can be evaluated. If it is ascertained by the monitoring device 32 through at least one evaluated sensor signal that a person is present in the passenger compartment 28 after the closing of the driver's door or another outer door, i.e., a change is recognized in the passenger compartment 28 by means of the at least one sensor signal, the monitoring device 32 will put out the presence signal P at predetermined times, such as cyclically or periodically or even one time after each repeated detection to the radio key device 26.

The radio key device 26 upon each reception of the presence signal P performs a key scan and reports the result, i.e., it either puts out the key presence signal A or a different signal or no signal at all. With each reception of the key presence signal A, the monitoring device 36 recognizes that the countdown must start again for the monitoring of the minimum time. Therefore, the monitoring device 36 will not switch off the internal combustion engine 14 after a remote start until the minimum time has fully run out without the key presence signal A having arrived once more. Only after this is the internal combustion engine 14 switched off.

Thanks to the repeated, especially cyclical key scan, it is recognized whether the radio key is inside the passenger compartment 28 of the motor vehicle 10. A takeover of the remote start by the person 12, i.e., by pressing the start control element 22 for example, is therefore possible for as long as the radio key 30 is present in the passenger compartment 28 and can be detected there by the radio key device 26. The recognizing of the driver's presence can occur, for example, by the closing of a seatbelt of a vehicle seat, such as the driver's seat 34, by the closing of an outer door, such as the driver's door, the activating of one of the pedals, such as the pedal 24, by a key scan itself or also by a camera unit or a seat occupancy detection.

Thus, on the whole, the invention makes possible the takeover of a remote start engine operation in a motor vehicle with keyless system, i.e., radio key device, with no time constraint for the takeover.

The invention claimed is:

1. Motor vehicle (10) with a remote start unit (18), a shutdown device (36) and a radio key device (26), wherein:
    the remote start unit (18) is designed to start an internal combustion engine (14) of the motor vehicle (10) upon wireless reception of a remote start signal (R), and
    the shutdown device (36) is designed to shut down the internal combustion engine (14) once more after a start by the remote start unit (18) in dependence on a shutdown condition, and
    the radio key device (26) is designed to detect a radio key presence in a passenger compartment (28) of the motor vehicle (10) by a key scan and to signal it by means of a key presence signal (A),
    characterized in that
    the shutdown condition is that the key presence signal (A) must have been inactive for a predetermined minimum time, and
    the motor vehicle (10) has a monitoring device (32), which is designed to detect by means of a sensor device (24, 38, 40, 42) of the motor vehicle (10) a person's presence in the passenger compartment (28) and upon detecting a person's presence to trigger the key scan by means of a control signal (P) at least at a predetermined time.

2. Motor vehicle (10) according to claim 1, wherein the monitoring device (32) is designed to detect by means of the sensor device (24, 38, 40, 42) the following events or a subset of the events: the closing of an outer door of the motor vehicle (10), a locking of a seatbelt buckle (42), an activating of one of the pedals (24) of the motor vehicle (10), a first-time activity of the key presence signal (A) after the starting by the remote start unit (18), a motion recognition by a motion sensor (38), especially by a camera (38), a seat occupancy detection (40).

3. Motor vehicle (10) according to claim 1, wherein the monitoring device (32) is designed to generate the control signal (P) several times and cyclically and thereby accomplish a cyclical key scan.

4. Motor vehicle (10) according to claim 3, wherein a cycle duration is smaller than the minimum time or equal to the minimum time.

5. Motor vehicle (10) according to claim 1, wherein the monitoring device (32) is designed to perform the person's presence after the starting of the internal combustion engine (14) by the remote start unit (18) several times and after each detected person's presence to generate the control signal (P) one time.

6. Motor vehicle (10) according to claim 1, wherein the monitoring device (32) is designed, upon detecting a person's presence, to generate the control signal (P) for the first time within the minimum time.

7. Motor vehicle (10) according to claim 1, wherein a takeover device (22) is provided and is designed to generate an activation-dependent takeover signal to deactivate the shutdown device.

8. Method for operating an internal combustion engine (14) of a motor vehicle (10), in that
    a remote start unit (18) starts the internal combustion engine (14) upon wireless reception of a remote start signal (R) and
    after this a shutdown device (36) monitors whether a shutdown condition if fulfilled, and optionally the internal combustion engine (14) is shut down again, wherein
    a radio key device (26) of the motor vehicle (10) is designed to detect a radio key presence in a passenger compartment (28) of the motor vehicle (10) by a key scan and to signal it by means of a key presence signal (A),
    characterized in that
    the shutdown condition is that the key presence signal (A) must be inactive for a predetermined minimum time, and
    a monitoring device (32) detects by means of a sensor device (24, 38, 40, 42) a person's presence in the passenger compartment (28) and upon detecting a person's presence triggers the key scan by means of a control signal (P) at least at a predetermined time.

* * * * *